(12) United States Patent
Okazaki

(10) Patent No.: US 7,936,396 B2
(45) Date of Patent: May 3, 2011

(54) IMAGE-PICKUP APPARATUS

(75) Inventor: Takashi Okazaki, Hyogo (JP)

(73) Assignee: Sony Corporation, Tokyo (JP)

( * ) Notice: Subject to any disclaimer, the term of this patent is extended or adjusted under 35 U.S.C. 154(b) by 336 days.

(21) Appl. No.: 11/854,899

(22) Filed: Sep. 13, 2007

(65) Prior Publication Data

US 2008/0284856 A1  Nov. 20, 2008

(30) Foreign Application Priority Data

Oct. 10, 2006 (JP) .................................. 2006-276306

(51) Int. Cl.
*H04N 5/225* (2006.01)

(52) U.S. Cl. ...................................................... 348/376

(58) Field of Classification Search ................... 396/277, 396/301, 299; D16/200, 206, 207, 216, 243
See application file for complete search history.

(56) References Cited

U.S. PATENT DOCUMENTS

| | | | | |
|---|---|---|---|---|
| 4,441,801 A * | 4/1984 | Mashimo et al. | ............. | 396/406 |
| 5,325,143 A * | 6/1994 | Kawano | .......................... | 396/59 |
| 6,118,949 A * | 9/2000 | Ohtani | .......................... | 396/277 |
| 7,163,151 B2 * | 1/2007 | Kiiskinen | ................ | 235/472.01 |
| 7,450,169 B2 * | 11/2008 | Jeon et al. | ................ | 348/333.11 |
| 2004/0169760 A1 * | 9/2004 | Furukawa | ................ | 348/333.12 |
| 2004/0223067 A1 * | 11/2004 | Seki et al. | ................ | 348/333.11 |
| 2005/0140793 A1 * | 6/2005 | Kojima et al. | ........... | 348/208.99 |
| 2005/0231610 A1 * | 10/2005 | Anderson | .................. | 348/222.1 |
| 2007/0033626 A1 * | 2/2007 | Yang et al. | .................... | 725/105 |
| 2007/0115383 A1 * | 5/2007 | Tsukatani | ................ | 348/333.11 |

FOREIGN PATENT DOCUMENTS

| | | |
|---|---|---|
| JP | 2002-221746 | 8/2002 |
| JP | 2002-262152 | 9/2002 |
| JP | 2002-281373 | 9/2002 |
| JP | 2006-197162 | 7/2006 |

* cited by examiner

*Primary Examiner* — Sinh Tran
*Assistant Examiner* — Jason A Flohre
(74) *Attorney, Agent, or Firm* — Oblon, Spivak, McClelland, Maier & Neustadt, L.L.P.

(57) ABSTRACT

An image-pickup apparatus includes a first operating member, to which a predetermined function is fixedly allocated and a second operating member capable of customizing an allocated function, in which the second operating member is arranged on the right back-face region of the image-pickup apparatus in a standard position, and the predetermined function allocated to the first operating member can also be allocated to the second operating member.

8 Claims, 13 Drawing Sheets

1

FIG. 12    <BEFORE CHANGE>

| CUSTOM KEY | ALLOCATING FUNCTION |
|---|---|
| C1 | PICTURE SIZE SETTING |
| C2 | ISO SETTING |
| C3 | IMAGE DELETE |

FIG. 13    <AFTER CHANGE>

| CUSTOM KEY | ALLOCATING FUNCTION |
|---|---|
| C1 | IMAGE REPRODUCING |
| C2 | ISO SETTING |
| C3 | IMAGE DELETE |

IMAGE-PICKUP APPARATUS

CROSS REFERENCES TO RELATED APPLICATIONS

The present invention contains subject matter related to Japanese Patent Application JP 2006-276306 filed in the Japanese Patent Office on Oct. 10, 2006, the entire contents of which are incorporated herein by reference.

BACKGROUND OF THE INVENTION

1. Field of the Invention

The present invention relates to an image-pickup apparatus, such as a digital camera.

2. Description of the Related Art

In an image-pickup apparatus, such as a digital camera, various functions may be achieved by invoking a menu picture frame to select an item in the menu. In such a technique, for achieving a certain function, comparatively complicated operations with the menu picture frame are needed.

Whereas, whenever comparatively frequently used functions are utilized, it is very difficult in operability to invoke the menu picture frame every time.

Then, a technique has been proposed in that predetermined functions frequently used for some users are allocated to an operating member (a button, etc.) so as to simply achieve the desired function by operating the operating member (see Japanese Unexamined Patent Application Publication No. 2002-262152, for example).

SUMMARY OF THE INVENTION

However, in this technique, of the position of the operating member customizing the allocated function mentioned above, it is hardly to be sufficiently taken in account.

For example, in the technique mentioned above, the operating member for customizing an allocated function is arranged on the rear left side. In such a case, most photographers may grip the body of an image-pickup apparatus mainly with the right hand; for operating the operating member, the left hand, which has been gripped another part (lens part, etc.) and is not a dominant hand in many cases, may be used or the right hand may be used after once canceling the grip with the right hand, so that it is not easy in operability to operate the operating member.

Then, it is desirable to provide an image-pickup apparatus more excellent in operability.

According to a first aspect of the present invention, an image-pickup apparatus includes a first operating member, to which a predetermined function is fixedly allocated; and a second operating member capable of customizing an allocated function, in which the second operating member is arranged on the right back-face region of the image-pickup apparatus in a standard position, and the predetermined function allocated to the first operating member can also be allocated to the second operating member.

According to a second aspect of the present invention, an image-pickup apparatus includes a first operating member, to which a predetermined function is fixedly allocated; and a second operating member capable of customizing an allocated function, in which when an operator grips the image-pickup apparatus with the right hand during photography with the image-pickup apparatus in a standard position, the second operating member is arranged in a first region where being capable of operating a target operating member with the right thumb by moving the joints of the right thumb without substantially changing the gripping state of the right hand portion except the thumb, and the predetermined function allocated to the first operating member can also be allocated to the second operating member.

According to the first aspect of the present invention, since the second operating member is arranged in the right back-face region of the image-pickup apparatus at the standard position, excellent operability can be obtained. The predetermined function fixedly allocated to the first operating member can also be allocated to the second operating member, so that the first operating member is not necessarily used but the function may be achieved by appropriately using the second operating member.

According to the second aspect of the present invention, the second operating member is arranged in the first region (i.e., the region where being capable of operating a target operating member with a right thumb by moving the joints of the right thumb without substantially changing a gripping state of a right hand portion except the thumb when an operator grips the image-pickup apparatus with the right hand during photography with the image-pickup apparatus at the standard position, so that excellent operability can be obtained. The predetermined function allocated to the first operating member can also be allocated to the second operating member, so that the first operating member is not necessarily used but the function may be achieved by appropriately using the second operating member.

BRIEF DESCRIPTION OF THE DRAWINGS

FIG. 12 is a drawing showing a setup content before the setup change;

FIG. 13 is a drawing showing a setup content after the setup change;

DESCRIPTION OF THE PREFERRED EMBODIMENTS

1. First Embodiment

[1-1. Apparatus Overview]

Figure 1:
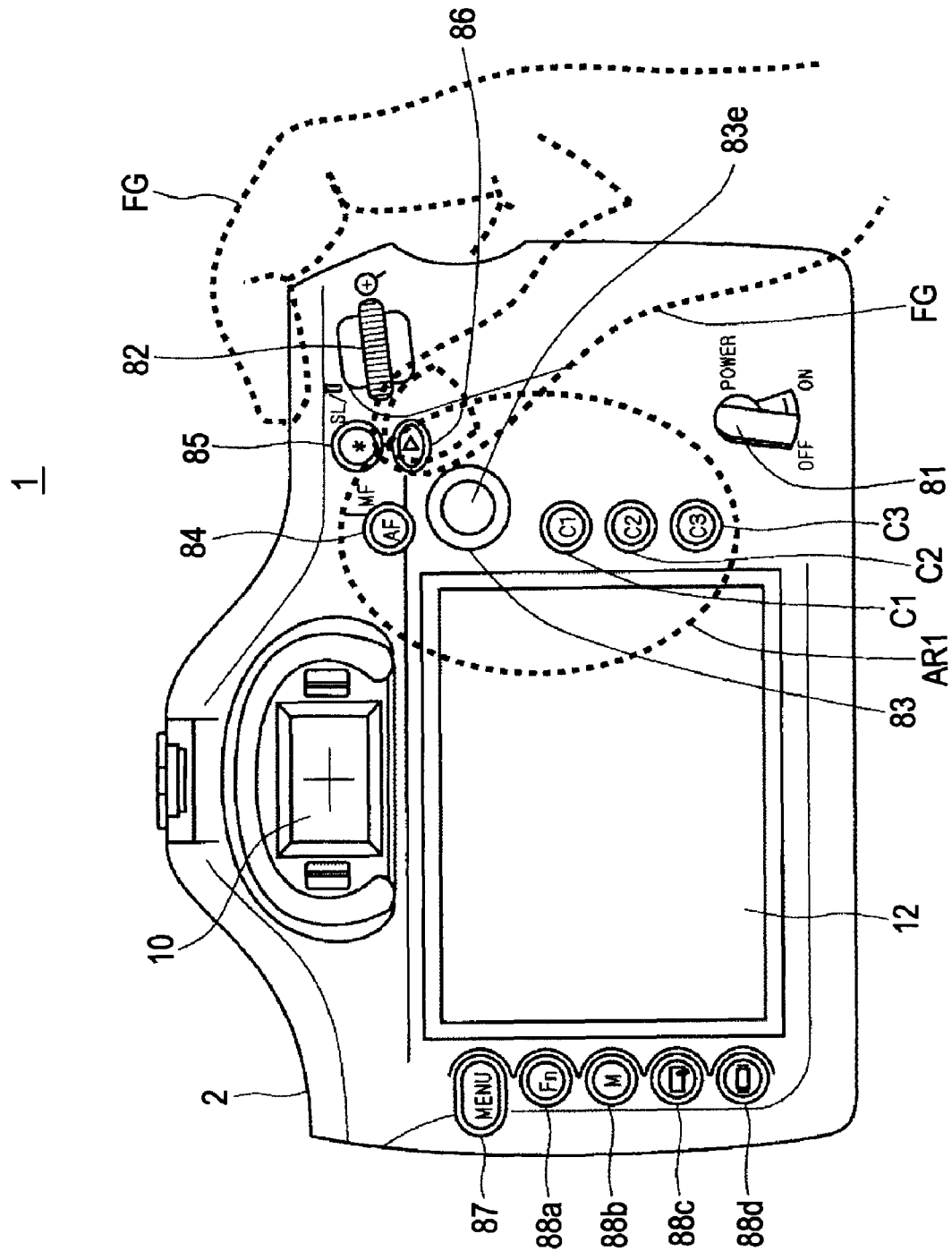
FIG. 1 is an outer rear view of an image-pickup apparatus.
Figure 2:
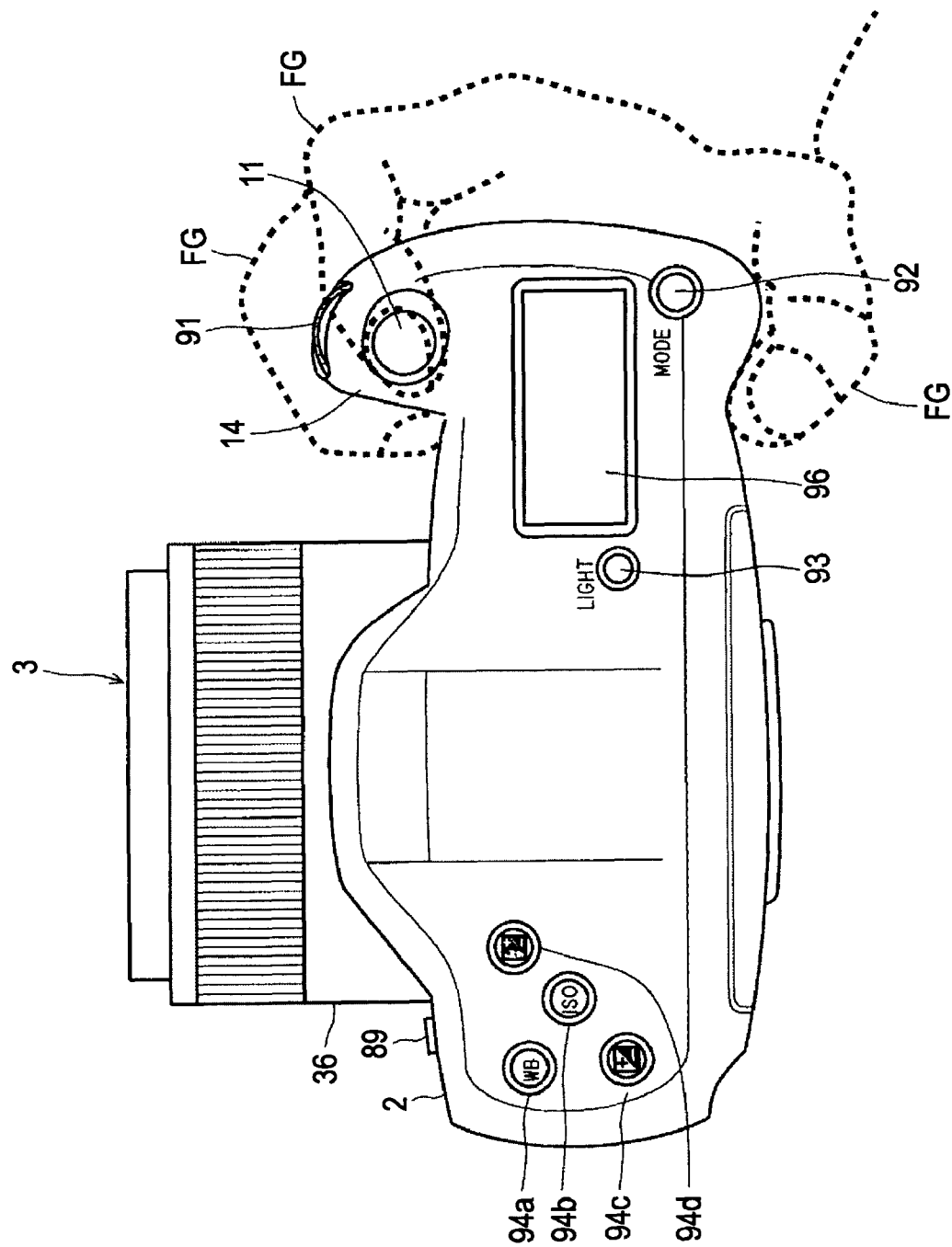
FIG. 2 is an outer top view of the image-pickup apparatus.

FIGS. 1 and 2 are outside drawings of an image-pickup apparatus 1 according to a first embodiment; FIG. 1 is an outer rear view of the image-pickup apparatus 1; and FIG. 2 is an outer top view of the image-pickup apparatus 1. The image-pickup apparatus 1 is a single-lens reflex digital camera with an interchangeable lens.

As shown in FIG. 2, etc., the image-pickup apparatus 1 includes a camera body 2 having an interchangeable taking-lens unit 3 detachably mounted thereon.

The taking-lens unit 3 mainly includes a lens barrel 36, a lens group 37 (see FIG. 3) accommodated within the lens barrel 36, and a diaphragm. The lens group 37 includes a focusing lens changing the focal position by its movement in the optical axial direction.

The camera body 2 is provided with an annular mount part Mt (not shown) arranged roughly at the front center to be mounted by the taking-lens unit 3 and a release button 89 arranged in the vicinity of the mount part Mt for putting on and taking off the taking-lens unit 3.

The camera body 2 is also provided with a grip part 14 arranged at the front left end (on the right view from the rear) to be gripped by a photographer and a shutter button 11 arranged on the upper rear side of the grip part 14 for instructing to start exposure. Within the grip part 14, a battery storage room and a card storage room are provided. In the battery storage room, four size-AA dry cells are stored for the power supply of the camera, for example, and in the card storage room, a memory card 90 (see FIG. 3) is detachably accommodated for storing image data of the exposed picture.

The shutter button 11 is a two-step detection button capable of detecting two states of a half push state (S1 state) and a total push state (S2 state). When the shutter button 11 is half-pushed to be the s1-state, preparatory operations, such as an AF (auto focus) control and an AE (automatic exposure) control, are performed for obtaining recording static images about an object. When the shutter button 11 is further pushed to be the s2-state, the object images are exposed with the actual imaging operation (an imaging element (below-mentioned)) and a series of predetermined image processing operations are performed on image signals obtained by the exposing operation.

Referring to FIG. 1, on the roughly central back face of the camera body 2, an optical finder 10 is provided. To the optical finder 10, object images are led from the taking-lens unit 3. A photographer can visually recognize an object by viewing the optical finder 10. More specifically, object images can be visually recognized via an eyepiece by viewing the object images, which have passed through the taking-lens unit 3; upward reflected by a mirror mechanism 6 (see FIG. 3); and passed through a penta prism. In such a manner, a picture can be composed with the optical finder 10. When actual images are taken, the mirror mechanism 6 is evacuated from an optical path of the object images; light from the taking-lens unit 3 arrives at an imaging device 5 by corresponding to the open timing of a shutter 4 (see FIG. 3) so as to obtain exposed object images (image data).

On the roughly central back face of the camera body 2 (slightly left side in more detail), a back-face monitor 12 is provided. The back-face monitor 12 is composed of a liquid crystal display (LCD), for example. The back-face monitor 12 is a display for displaying a menu picture for setting imaging conditions and for reproduction displaying the exposed images stored in the memory card 90.

On the lower right back face of the camera body 2, on the lower right of the back-face monitor 12 in more detail, a main switch 81 is provided. The main switch 81 is a lever switch in that when its lever is set at the left "OFF" position, the power supply is turned off while when the lever is set at the right "ON" position, the power supply is turned on.

On the upper right back face of the camera body 2, on the right of the back-face monitor 12 in more detail, a multi-selector 83 is provided. The multi-selector 83 is a joy-stick type operating member in that its stick part 83e can be inclined up/down and right/left in four directions as well as can be pushed down.

On the upper right back face of the camera body 2, on the right of the back-face monitor 12 as well as above the multi-selector 83 in more detail, a rear command dial 82, an AF/MF control button 84, an AE lock button 85, and a reproducing button 86 are provided.

The rear command dial 82 is a rotary operating member capable of changing various established contents in accordance with its rotation.

The AF/MF control button 84 is a button for receiving the instruction of switching the mode between auto focus (AF) and manual focus (MF). In an imaging state, every time this button is pushed, the auto focus (AF) and the manual focus (MF) are successively switched.

The AE lock button 85 is a button for receiving the instruction locking the exposure state (AE lock) adjusted by the automatic exposure operation when taking a picture. The AE lock button 85 also serves as "a slow synchro button" when doing flash photography. The AE lock button 85 also serves as "a delete button" for receiving the instruction deleting images to be reproduced during reproducing.

The reproducing button 86 is a button for receiving the instruction switching the mode to the reproducing mode. In other words, the reproducing button 86 is a button, to which the function to switch the mode to the reproducing mode (the function to invoke the reproducing mode) is allocated. When the reproducing button 86 is pushed down in a photographic state, the image-pickup apparatus 1 is switched to the reproducing mode so as to display shot images on the back-face monitor 12.

On the right back face of the camera body 2, on the right of the back-face monitor 12 in more detail, three push-button custom keys (also referred to as custom buttons) C1, C2, and C3 are also arranged. The custom keys C1, C2, and C3 are hard keys, to which functions can be variably allocated by a user. In other words, the custom keys C1, C2, and C3 are operating members that can customize the allocating function. The custom keys C1, C2, and C3 will be described later.

On the left back face of the camera body 2, on the left of the back-face monitor 12 in more detail, a menu button 87, a function button 88a, a memory switch button 88b, an image quality adjust button 88c, and a picture frame switch button 88d are provided.

The menu button 87 is a button for achieving the display function (the invoking function) of the menu picture frame. When the menu button 87 is pushed down, a menu picture frame including a plurality of items for performing various settings is displayed on the back-face monitor 12.

The function button 88a is a button for achieving the display function (the invoking function) of a sub-menu picture frame about part of the plurality of items included in the menu picture frame to display on the back-face monitor 12. For example, when the function button 88a is pushed down during doing photography, the menu picture frame for photography is displayed on the back-face monitor 12, and when the function button 88a is pushed down during reproducing, the menu picture frame for reproducing is displayed on the back-face monitor 12.

The memory switch button 88b is a button for switching recording media (memory cards, etc.), to which shot images are recorded. In the image-pickup apparatus 1, a plurality of kinds of the memory card can be accommodated at predetermined positions of the image-pickup apparatus 1. When a plurality of kinds of the memory card are accommodated, by pushing down the memory switch button 88b, it can be established in advance which kind of the memory card is selected for recording.

The image quality adjust button 88c is a button for selectively setting the quality (standard, fine, RAW, etc.) of recorded images. The quality of recorded images is changed by switching the presence of compression (JPEG (joint picture expert group) compression, etc.) or by switching the compression ratios during compression recording.

The picture frame switch button 88d is a button for switching whether photographic information is displayed to overlap with reproduced images or not as well as for switching contents of the photographic information displayed to overlap therewith. For example, by pushing down the picture frame switch button 88d, it can be selectively and circularly switched between a picture frame displaying only reproduced images, a picture frame displaying alphabetic information to overlap with the reproduced images, and a picture frame displaying the histogram about brightness to overlap with the reproduced images.

As shown in FIG. 2, on the top face of the camera body 2, a mode setup button 92, a light button 93, a white balance button 94a, an ISO sensitivity button 94b, an exposure correction button 94c, a dimmer correction button 94d, and a liquid crystal display panel 96 are also provided. In front of the shutter button 11, a front command dial 91 is also provided.

The front command dial 91 is a rotary operating member capable of changing various established contents in accordance with its rotation.

The mode setup button 92 is an operating member for setting up (switching) various modes of the camera. Every time the mode setup button 92 is pushed down, the established content is sequentially as well as circularly changed so as to determine the established content. By pushing down such a mode setup button 92, a desired mode can be selected from various photographic modes (specifically, a P mode (program mode), an A mode (diaphragm priority mode), an S mode (shutter speed priority mode), an M mode (manual mode), a person photographic mode, a landscape photographic mode, and a full-auto photographic mode).

The white balance button 94a is a button for adjusting white balance; the ISO sensitivity button 94b is a button for adjusting ISO sensitivity; the exposure correction button 94c is a button for exposure correction correcting the brightness of the entire picture; and the dimmer correction button 94d is a button for dimmer correction adjusting the light emission of the flash.

The liquid crystal display panel 96 is a display for displaying present various established contents. The backlight of the liquid crystal display panel 96 is turned on or off by pushing the light button 93 down.

By operating the rear command dial 82 or the front command dial 91, control values in various photographic modes can be established. For example, in S mode (shutter speed priority mode), by the rotational operation of the front command dial 91, a desired shutter speed can be selected from a plurality of stages of setup values. Furthermore, by rotating the front command dial 91 after pushing down the ISO sensitivity button 94b, the desired value of the ISO sensitivity can be selected and set from a plurality of stages of setup values. Similarly, with the combination of the white balance button 94a and the front command dial 91, the combination of the exposure correction button 94c and the front command dial 91, or the combination of the dimmer correction button 94d and the front command dial 91, by similar setting operation, the setup content corresponding to each button can be established. Instead of the above front command dial 91, the same setting operation can be performed by using the rear command dial 82.

In the peripheral regions of the above-mentioned buttons 84, 85, 86, 87, 88a to 88d, 92, 93, and 94a to 94d, or in the buttons themselves, functional contents fixedly allocated to each button are designated with characters or graphic forms (marks), respectively. These display contents are silk-screen-printed, for example, on the respective corresponding portions of the camera body 2. For example, in the center of the reproducing button 86, a graphic form designating the reproducing function (invoking function of the reproducing mode) is silk-screen-printed. In the center of the menu button 87, four characters "MENU" are also silk-screen-printed.

[1-2. Functional Block]

Figure 3:
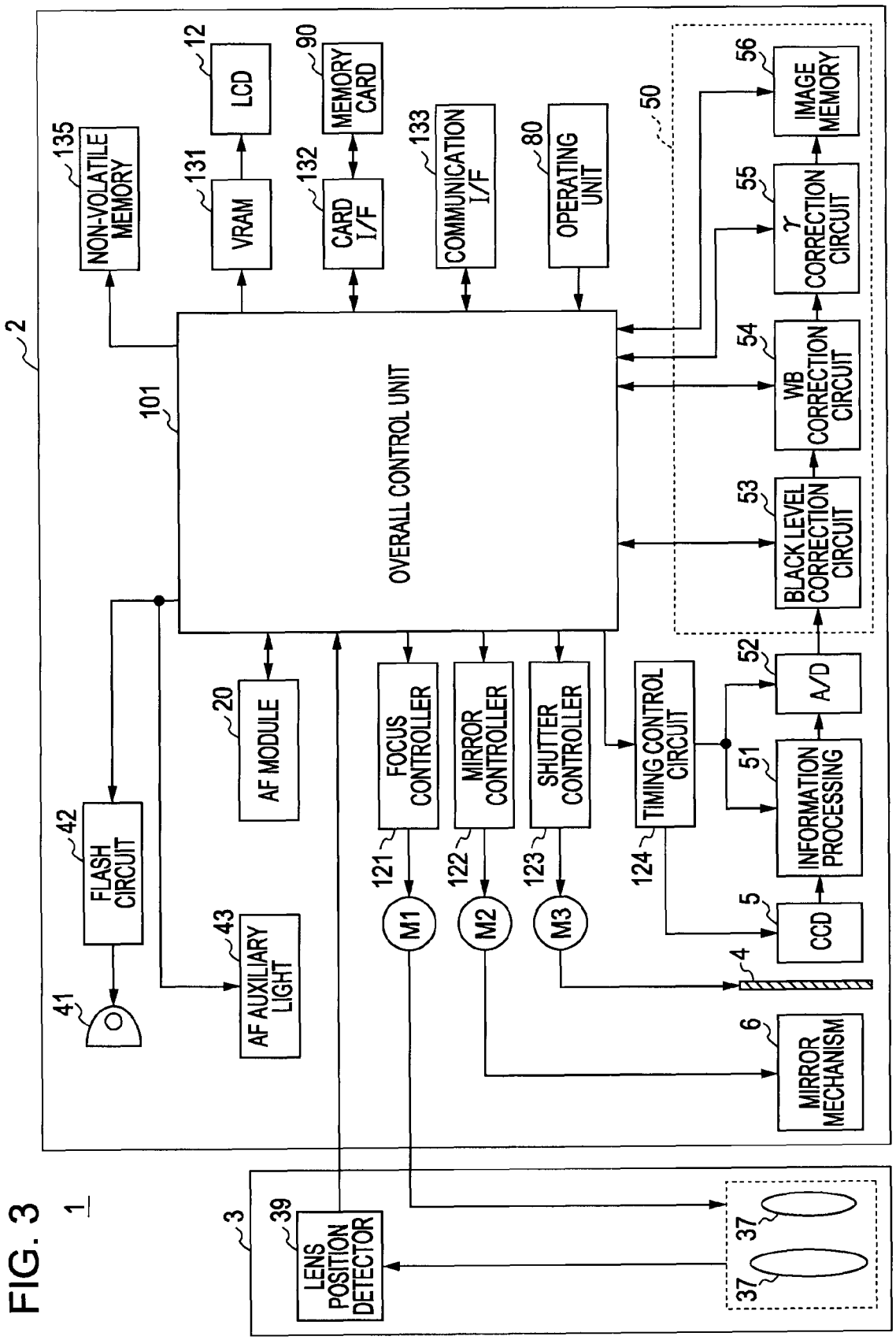
FIG. 3 is a functional block diagram of the image-pickup apparatus.

Next, the functional block of the image-pickup apparatus 1 will be described with reference to FIG. 3. FIG. 3 is a functional block diagram of the image-pickup apparatus 1.

As shown in FIG. 3, the image-pickup apparatus 1 includes an operating unit 80, an overall control unit 101, a focus controller 121, a mirror controller 122, a shutter controller 123, a timing control circuit 124, and a digital signal processing circuit 50.

The operating unit 80 includes various buttons including the shutter button 11 (see FIG. 1) and switches. The overall control unit 101 achieves various operations in accordance with the input to the operating unit 80 by a user. The overall control unit 101 is a micro computer mainly including a CPU, a memory, and an ROM. The overall control unit 101 achieves various functions by reading a program stored in the ROM so as to execute the program with the CPU. For example, the overall control unit 101 controls focusing by controlling the position of a focus lens operatively in connected with an AF module 20 and the focus controller 121. The overall control unit 101 achieves the AF function using the focus controller 121 in accordance with the focusing state of an object detected by the AF module 20. The AF module 20 can detect the focusing state of an object by a technique detecting the focusing state, such as a phase difference detection system, using the incident light via the mirror mechanism 6.

The focus controller 121 produces a control signal based on the signal inputted from the overall control unit 101 so as to move the focus lens included in the lens group 37 of the taking-lens unit 3 by driving a motor M1. The position of the focus lens is detected by a lens position detector 39 so that data showing the position of the focus lens is supplied to the overall control unit 101. In such a manner, the focus controller 121 and the overall control unit 101 control the movement of the focus lens in the optical axial direction.

The mirror controller 122 controls the state switch between the state of the mirror mechanism 6 evacuated from the optical path (mirror up state) and the state of the mirror mechanism 6 blocking off the optical path (mirror down state). The mirror controller 122 produces a control signal based on the signal inputted from the overall control unit 101 so as to switch the state between the mirror up state and the mirror down state by driving a motor M2.

The shutter controller 123 produces a control signal based on the signal inputted from the overall control unit 101 so as to control the open/close of the shutter 4 by driving a motor M3.

The timing control circuit 124 controls the timing of the imaging device 5.

The imaging device (referred herein to as a CCD sensor (also simply referred to as a CCD)) 5 photo-electrically converts an object image into an electrical signal to form a photographic image signal. The imaging device 5 exposes an object image focused on a light receiving plane (charge accumulation by photo-electrical conversion) in response to drive control signals (an accumulation start signal and an accumulation terminate signal) inputted from the timing control circuit 124 so as to form an object image signal. The imaging device 5 also outputs the image signal to a signal processor 51 in response to a read-out control signal inputted from the timing control circuit 124. A timing signal (a synchronizing signal) from the timing control circuit 124 is inputted into the signal processor 51 as well as into an A/D (analog/digital) conversion circuit 52.

Predetermined analog signal processing is performed on the image signal obtained by the imaging device 5 in the signal processor 51. After the analog signal processing, the image signal is converted into digital image data by the A/D conversion circuit 52 so as to enter the digital signal processing circuit 50.

In the digital signal processing circuit 50, digital signal processing is performed on the image data inputted from the A/D conversion circuit 52 so as to produce the photographic image data. The digital signal processing circuit 50 includes a black level correction circuit 53, a white balance (WB) correction circuit 54, a γ correction circuit 55, and an image memory 56.

The black level correction circuit 53 corrects the black level of each pixel constituting the image data outputted from the A/D conversion circuit 52 to the reference black level. The WB correction circuit 54 adjusts the white balance of the images. The γ correction circuit 55 converts the gradation of the photographic image. The image memory 56 is a high-speed accessible image memory for temporarily storing the produced image data, and has a capacity storing multiple frames of image data.

When taking a picture, appropriate image processing is performed on the image data temporarily stored in the image memory 56 by the overall control unit 101, and the image data is stored in the memory card 90 via a card I/F 132.

The image data temporarily stored in the image memory 56 is appropriately transferred to a VRAM (video RAM) 131 so that the image is displayed based on the image data. Thereby, the confirmation display for confirming the photographic image (after view) and the reproduction display for reproducing the already taken image are achieved.

Furthermore, the image-pickup apparatus 1 includes a communication I/F 133 so as to data communicate with instruments (a personal computer, etc., for example) connected to the communication I/F 133.

The image-pickup apparatus 1 also includes a flash 41, a flash control circuit 42, and an AF auxiliary light 43. The flash 41 is a light source used when the object brightness is insufficient. The turning on or off and the lighting time of the flash 41 are controlled by the flash control circuit 42 and the overall control unit 101. The AF auxiliary light 43 is an auxiliary light source for the AF. The turning on or off and the lighting time of the AF auxiliary light 43 are controlled by the overall control unit 101.

The image-pickup apparatus 1 further includes a non-volatile memory 135, to which various setup contents in the image-pickup apparatus 1 are stored.

[1-3. Custom Key]

[Arrangement]

Then, custom keys C1, C2, and C3 (see FIG. 1) will be described. As mentioned above, the custom keys C1 to C3 are operating members capable of customizing the allocated function.

Figure 4:
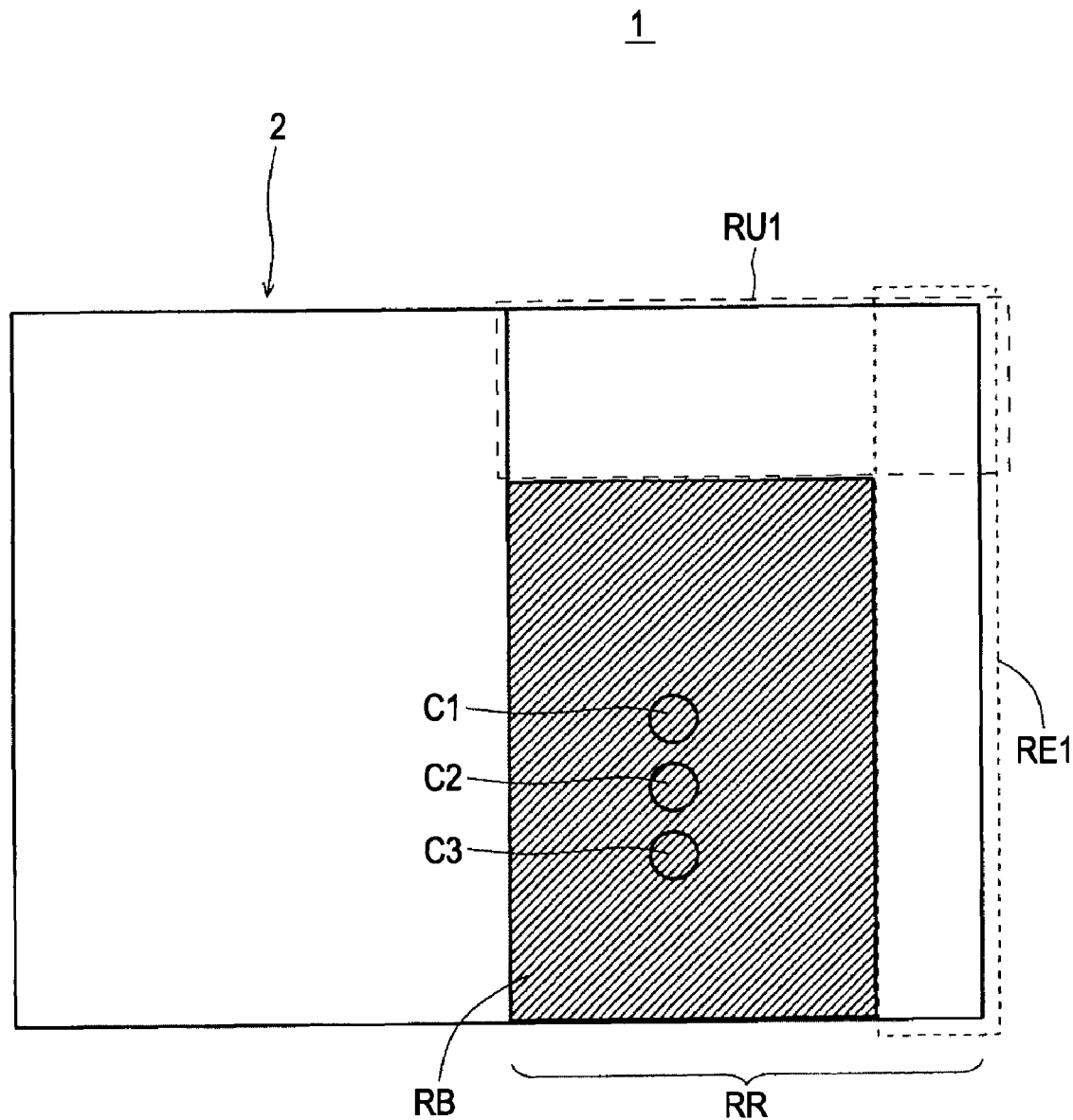
FIG. 4 is a conceptual diagram showing the back face of the image-pickup apparatus.

As shown also in FIG. 4, the custom keys C1, C2, and C3 are arranged on the right region RR of the back face of the image-pickup apparatus 1. In detail, the custom keys C1, C2, and C3 are arranged in a region of the region RR other than the right peripheral portion RE1 (a quarter portion of the region RR from the right end, for example). Also, the custom keys C1, C2, and C3 are arranged in a region of the region RR other than the upper peripheral portion RU1 (a quarter portion of the region RR from the top end, for example). Accordingly, the custom keys C1, C2, and C3 are arranged in the region RB (indicated by oblique lines, in the drawing) of the region RR other than the right peripheral portion RE1 and the upper peripheral portion RU1.

As shown also in FIGS. 1 and 2, the custom keys C1, C2, and C3 are arranged on the right side from the back-face monitor 12, in the right peripheral region of the back-face monitor 12, in more detail.

When an operator herein takes a picture in a position of the bottom plane of the image-pickup apparatus 1 roughly horizontal to the ground (referred to as "standard position" or "lateral position"), the shutter button 11 arranged on the right of the image-pickup apparatus 1 is touched with the index finger of the operator's right hand while the body of the image-pickup apparatus 1 (on the right side, in detail (the grip part 14)) being gripped with the right hand, so that the picture composition may be determined. In this application, right/left and up/down are defined based on the standard position (see FIG. 1) as a reference.

In FIGS. 1 and 2, the position of the right hand fingers FG is also shown. Referring to FIG. 1, during taking a picture in the standard position of the image-pickup apparatus 1, the position of the right hand thumb pushing down the reproducing button 86 is shown. When taking a picture in the standard position of the image-pickup apparatus 1, the right hand thumb may exist at the position shown in FIG. 1; however, in view of preventing the improper operation, it is preferable that the thumb exist at a position slightly lower than that shown in FIG. 1 (just right beside the custom key C1 as well as just below the reproducing button 86, for example).

Upon taking a picture in the standard position in such a manner, since the custom keys C1, C2, and C3 are arranged on the right region RR of the back face of the image-pickup apparatus 1 (the region RB, in more detail), each of the custom keys C1, C2, and C3 can be preferably operated with the right hand fingers (especially with the right thumb). In particular, since the custom keys C1, C2, and C3 are arranged in the right peripheral region of the back-face monitor 12, the operability with the right thumb is very favorable.

When an operator grips the image-pickup apparatus in the standard position with the right hand in taking a picture, it may also be expressed that the custom keys C1, C2, and C3 are arranged in a range capable of operating a target operating member with the right thumb by moving the joints of the right thumb (at least one of the top joint, the second joint, and the third joint) without substantially changing the gripping state of the right hand portion except the thumb (referred to as an "excellent operability region" in the standard position or a first class region, below). The "excellent operability region" in the standard position is shown by an elliptical region AR1 surrounded by a broken line in FIG. 1, for example. The position and size of the "excellent operability region" are determined based on the size of the hand fingers of a standard adult male as a reference.

Thus, the operator can push down the custom keys C1, C2, and C3 by moving only the right thumb without canceling the grip state with the right hand (specifically, the palm) as well as without substantially displacing the gripping position, enabling the operability to be improved to a large extent. Namely, the operator can push down the custom key by moving the right thumb to the desired custom key without substantially changing the state gripping the image-pickup apparatus 1 with the right hand, so that excellent operability can be obtained. Such excellent operability can be obtained even when gripping the image-pickup apparatus 1 with only the right hand (i.e., one hand) while being obtained when gripping the image-pickup apparatus 1 with the left and right hands (i.e., both hands).

Then, to the custom keys C1, C2, and C3 having such excellent operability, any function of the other operating members 84, 85, 86, 87, 88a to 88d, 92, 93, and 94a to 94d can be allocated. For example, to the custom key C1, the function of the function button 88a can be allocated and/or to the custom key C2, the function of the ISO sensitivity button 94b can be allocated.

As described above, by operating the custom keys C1, C2, and C3 with very excellent operability, the function allocated to the custom key can be achieved, so that an operator has very excellent operating feeling.

In the above description, the custom keys C1, C2, and C3 are located in the "excellent operability region"; however, the invention is not limited to this configuration.

For example, the custom keys C1, C2, and C3 may be arranged in the following "medium operability region". Even in such a manner, excellent operability can also be obtained.

When an operator grips the image-pickup apparatus in the standard position with the right hand, the "medium operability region" in the standard position herein means a range (region) capable of operating a target operating member with the right thumb by substantially changing the gripping position with the right hand except the thumb and/or by changing the grip angle. In other words, it may also be expressed that the "medium operability region" in the standard position is a region necessary for substantially changing the gripping state with the right hand except the right thumb. It may also be expressed that the above-mentioned right back-face region RR is a region including part or the entire of such "medium operability region" and the above-mentioned "excellent operability region".

Whereas, the custom keys C1, C2, and C3 may be arranged in the following "low operability region" in the standard position. For example, the custom keys C1, C2, and C3 may also be arranged in the left peripheral region of the back-face monitor 12.

When an operator grips the image-pickup apparatus in the standard position with the right hand, the "low operability region" in the standard position herein means a range substantially necessary for canceling the gripping state by separating the right hand (specifically, almost the entire palm) from the image-pickup apparatus for operating a target operating member with the right thumb. The "low operability region" is also referred to as a "second class region". The above-mentioned "medium operability region" has the medium operability between the "low operability region" (second class region) and the "excellent operability region" (first class region), so that it may also be referred to as a "$1.5_{th}$ class region".

However, for obtaining higher operability, it is preferable to arrange the custom keys C1, C2, and C3 in the "medium operability region" ($1.5_{th}$ class region) rather than in the "low operability region" (second class region). Also, for obtaining further higher operability, it is preferable to arrange the custom keys C1, C2, and C3 in the "excellent operability region" (first class region).

[Superimposing Functional Allocation]

The image-pickup apparatus 1 is configured so that to the custom keys C1, C2, and C3, the function fixedly allocated to the other operating members of the image-pickup apparatus 1 can be allocated in a pile. The other operating members, (i.e., the function is fixedly allocated to the member, but the members cannot be customized to allocated functions) are also referred to fixed functional operating members N1. The fixed functional operating member N1 may include the above-mentioned various setup buttons 84, 85, 86, 87, 88a to 88d, 92, 93, and 94a to 94d.

For example, a predetermined function allocated to the reproducing button 86 (i.e., the instructing function to change to the reproducing mode) can also be allocated to the custom key C3 while being continuously allocated to the reproducing button 86 (in other words, without canceling the allocation to the reproducing button 86). That is, a predetermined function fixedly allocated to the reproducing button 86 can be allocated to the custom key C3 in a pile.

When the function of the reproducing button 86 is also allocated to the custom key C3, the change to the reproducing mode can be instructed by pushing down any one of the reproducing button 86 and the custom key C3. Hence, for achieving the instructing function to change to the reproducing mode with simple operation, the custom key C3 is not necessarily used and the reproducing button 86 (the fixed functional operating member N1) may also be appropriately used. This case is convenient to an operator because of the high arbitrary property. For example, when the allocation contents to the custom key C3 is obscured in memory for the operator and the operator is at a loss, the function can be securely invoked using the reproducing button 86. In particular, since the reproducing button 86 has an added graphic symbol showing its function, the button is visually recognizable.

The target functions allocated to the custom keys C1, C2, and C3 are not limited to the functions allocated to the above-mentioned buttons 84, 85, 86, 87, 88a to 88d, 92, 93, and 94a to 94d. Functions allocated to buttons provided in the image-pickup apparatus other than the above-mentioned buttons may also be allocated.

Alternatively, the functions allocated to different kinds of operating members (such as a slide switch and a dial) from the buttons provided in the image-pickup apparatus may also be allocated to the custom keys. When the function of the operating member other than the buttons is allocated to the custom key (custom button), the concept described above may be applied in consideration of the difference between the operating members. For example, when the function of a certain dial is allocated to the custom key, the setup operation corresponding to the rotating operation may be substituted for the setup operation corresponding to the button pushing down operation of the custom key. Namely, the setup content may be changed in accordance not with the dial rotating operation but with the pushing down operation of the custom key (custom button).

[1-4. Vertical Position]

In the above description, the operability when a picture is taking in a position of the bottom plane of the image-pickup apparatus 1 roughly horizontal to the ground (lateral position) has been described.

Then, the operability when a picture is taking in a position of the bottom plane of the image-pickup apparatus 1 roughly horizontal to the ground (also referred to as a "vertical position") will be described.

The image-pickup apparatus 1 described above may be detachably provided with an auxiliary part for photography in a vertical position (vertical photography), specifically, a vertical-position control grip 7. With the image-pickup apparatus 1 having the vertical-position control grip 7 attached thereto, a case herein is assumed where a picture is taken in the vertical position and the lateral position.

Figure 5:
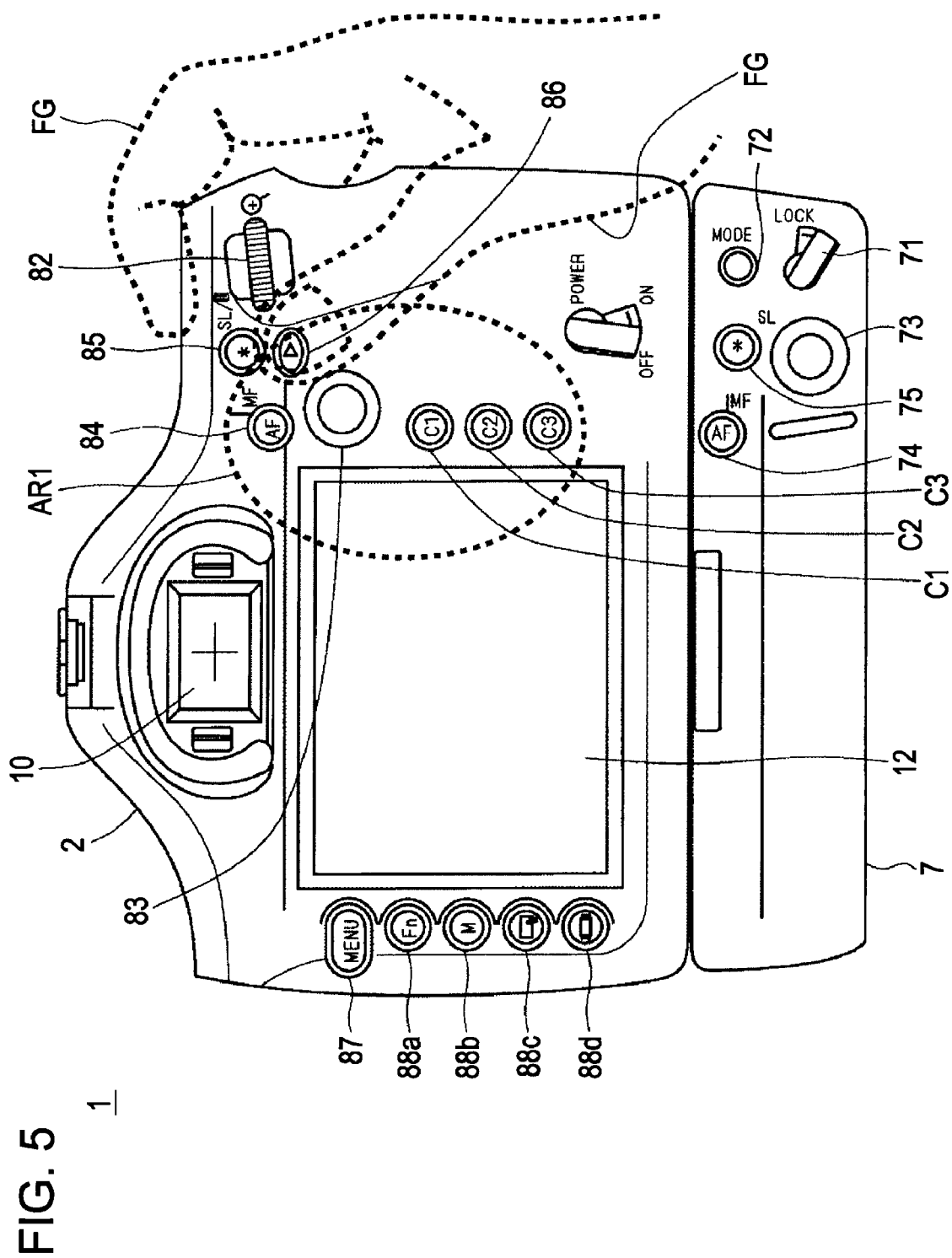
FIG. 5 is a rear view of the image-pickup apparatus (at a lateral position) having a vertical-position control grip attached thereto.
Figure 6:
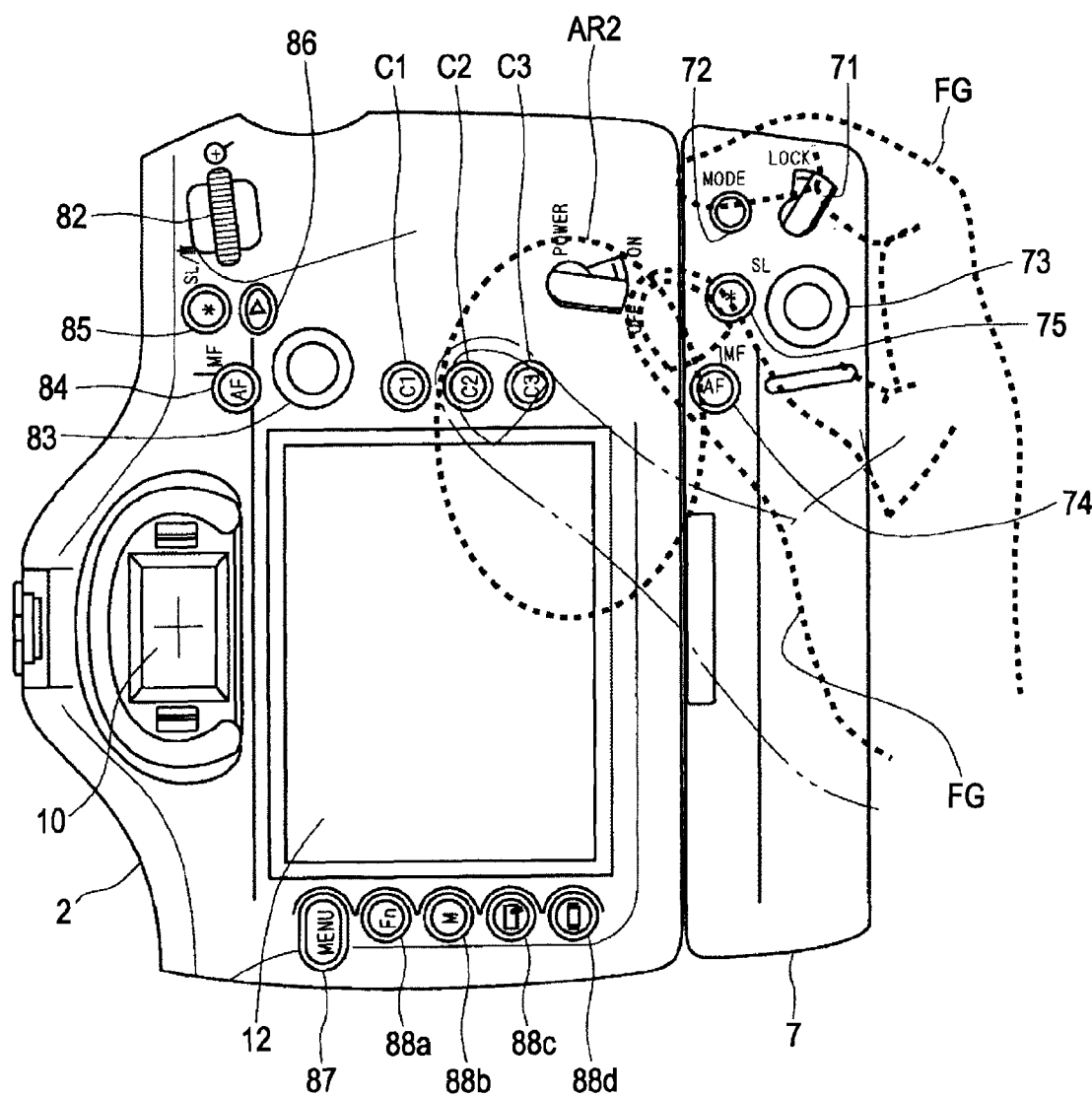
FIG. 6 is a rear view of the image-pickup apparatus (at a vertical position) having the vertical-position control grip attached thereto.

FIGS. 5 and 6 are rear views of the image-pickup apparatus 1 having the vertical-position control grip 7 attached thereto; FIG. 5 shows a photographic state in the lateral position; and FIG. 6 in the vertical position.

The vertical-position control grip 7 includes a shutter button 79 (not shown), a mode setting button 72, a multi-selector 73, an AF/MF control button 74, and an AE lock button 75.

The shutter button 79 has the same structure as that of the shutter button 11, and is arranged at a position slightly lower than the top face of the vertical-position control grip 7 in the vertical position shown in FIG. 6 (in the lateral position shown in FIG. 5, a position slightly closer to the left from the right side). The shutter button 79 is arranged at a front position in the depth direction. FIG. 6 also shows the position of the right hand fingers FG during the photography in the vertical position. In the vertical position of the image-pickup apparatus 1 (see FIG. 6), the shutter button 79 can input the start instruction of taking a picture with the same operating feeling as that of the shutter button 11. In the photography at the vertical position according to the embodiment, the situation that the shutter button 79 is pushed down with the right hand index finger is assumed.

The mode setting button 72, the multi-selector 73, the AF/MF control button 74, and the AE lock button 75 have the same configuration as those of the mode setup button 92 (see FIG. 2), the multi-selector 83 (see FIG. 1), the AF/MF control button 84, and the AE lock button 85, respectively, so as to achieve the same function. The operating members 72, 73, 74, and 75 are arranged on the right back-face in the vertical position, and have high operability.

When the vertical-position control grip 7 is attached to the camera body 2, both the vertical-position control grip 7 and the camera body 2 are electrically connected together, so that the pushing down states of various operating members 72 to 75 are transmitted to the overall control unit 101. Thus, by operating the operating members 72, 73, 74, 75, and 79, an operator can achieve the same functions as those would be achieved by operating the corresponding operating members 92, 83, 84, 85, and 11.

As shown in FIG. 6, during photography in such a vertical position, the custom keys C2 and C3 are arranged in the elliptical region AR2. In other words, the custom keys C2 and C3 are arranged in an "excellent operability region" (below mentioned) in the vertical position. Hence, even in the photography in the vertical position, very high operability can be obtained in pushing down the custom keys C2 and C3. When an operator grips the image-pickup apparatus in the vertical position with the right hand for taking a picture in the vertical position, the "excellent operability region" (also referred to as a "first class region") means a range capable of operating a target operating member with the right thumb by moving the joints of the right thumb (at least one of the top joint, the second joint, and the third joint) without substantially changing the gripping state of the right hand portion other than the thumb.

Accordingly, the custom keys C2 and C3 are arranged in a product region (AND region or overlap region) of the "excellent operability region" in the standard position (lateral position) (the region AR1 of FIG. 5, for example) and the "excellent operability region" in the vertical position (the region AR2 of FIG. 6, for example). Hence, in any position, the custom keys C2 and C3 can be operated with very favorable operability.

The custom key C1 is also arranged in a "medium operability region" (also referred to as a "$1.5_{th}$ class region") in the vertical position. Hence, even in the photography in the vertical position, the custom key C1 can be preferably operated. When an operator grips the image-pickup apparatus in the vertical position with the right hand, the "medium operability region" in the vertical position means a range (region) capable of operating a target operating member with the right thumb by substantially changing the gripping position with the right hand except the thumb and/or by changing the grip angle. In other words, it may also be expressed that when an operator grips the image-pickup apparatus in the vertical position with the right hand, the "medium operability region" in the vertical position is a region necessary for substantially changing the gripping state with the right hand except the right thumb to operate a target operating member with the right thumb.

During the photography in such a vertical position, the custom keys C2 and C3 are arranged in the right side region in the vertical position of FIG. 6 (i.e., the right half-region close to the shutter button 79). In such a manner, it is preferable that the custom key be arranged in a product region of the right back-face region in the lateral position and the right back-face region in the vertical position. Thereby, in any position, the custom key can be operated with preferable operability.

In the image-pickup apparatus 1 at the lateral position, the reproducing button 86 is arranged on the upper right back-face. The reproducing button 86 itself is also arranged at an easily operable position (specifically, in the "excellent operability region" in the standard (lateral) position (first class region)). Therefore, when an operator takes a picture with the image-pickup apparatus 1 in the lateral position, the instruction function to change to the reproducing mode can be executed using the reproducing button 86 with very excellent operability.

However, since in the vertical position of the image-pickup apparatus 1, the reproducing button 86 is located in the left end region (in this case, in the "low operability region" (also referred to as a "second class region") at the vertical position) (see FIG. 6), the operability when the reproducing button 86 is operated with the right thumb is not so good. When an operator grips the image-pickup apparatus in the vertical position with the right hand, the "low operability region" in the vertical position means a range substantially necessary for canceling the gripping state by separating the right hand (specifically, almost the entire palm) from the image-pickup apparatus for operating a target operating member with the right thumb.

Whereas, even at the vertical position, the custom keys C2 and C3 are located within the range where is preferably operable with the right thumb (the "excellent operability region" (first class region), for example).

Thus, if the function of the reproducing button 86 is allocated to the custom key C2 (or C3), during the photography with the image-pickup apparatus 1 in the vertical position, an operator can execute the instruction function to change to the reproducing mode using the custom key C2 (or C3).

In such a manner, the function of the reproducing button 86 existing in the "excellent operability region" (first class region) at the lateral position can be allocated to the custom key C2 (or C3) existing in the "excellent operability region" (first class region) at the vertical position. In this case, by operating at the lateral position using the reproducing button 86 as well as at the vertical position using the custom key C2 (or C3), the high operability can be obtained both in the lateral and vertical positions. Even especially when the reproducing button 86 is not located in the "excellent operability region" (first class region) at the vertical position, by operating the custom key C2 (or C3) in the vertical position, the very excellent operability can be obtained even at the vertical position.

It may also be expressed that the arrangement of the reproducing button 86 and the custom key C2 (or C3) is that the reproducing button 86 is arranged in the right back-face region of the image-pickup apparatus in the lateral position while the custom key C2 (or C3) is arranged in the right back-face region of the image-pickup apparatus in the vertical position.

Even when it is assumed that the reproducing button 86 is arranged not in the "excellent operability region" (first class region) at the lateral position but in the "medium operability region" ($1.5_{th}$ class region) at the lateral position (the position of the AE lock button 85 in FIG. 5, for example), the reproducing button 86 existing in the right back-face region at the lateral position can be allocated to the custom key C2 (or C3) existing in the right back-face region at the vertical position. In this case, by operating at the lateral position using the reproducing button 86 as well as at the vertical position using the custom key C2 (or C3), the high operability can be obtained both in the lateral and vertical positions.

[1-5. Setup Changing Operation]

Figure 7:
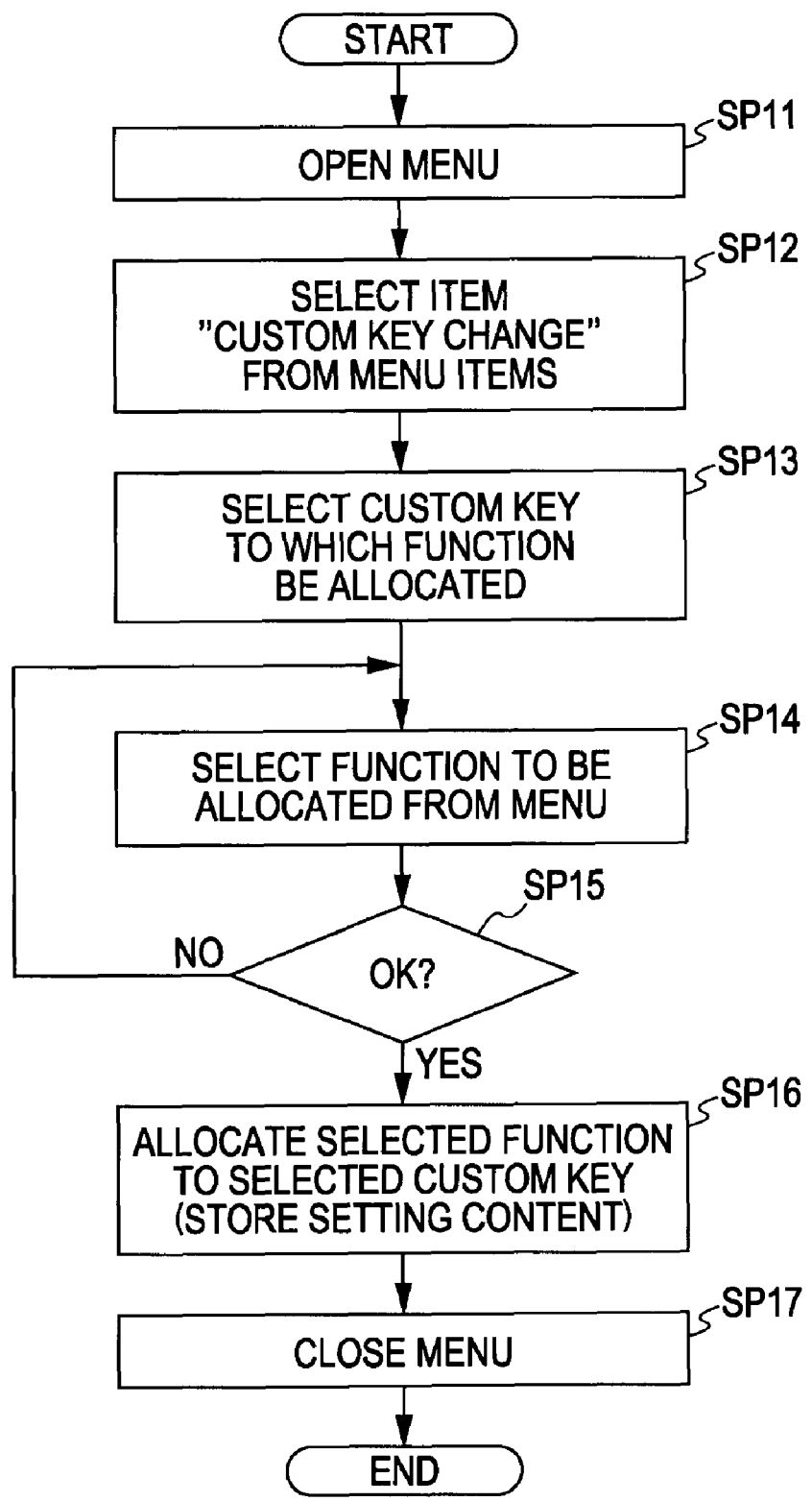
FIG. 7 is a flowchart showing the setup changing operation of an allocated function.
Figure 8:
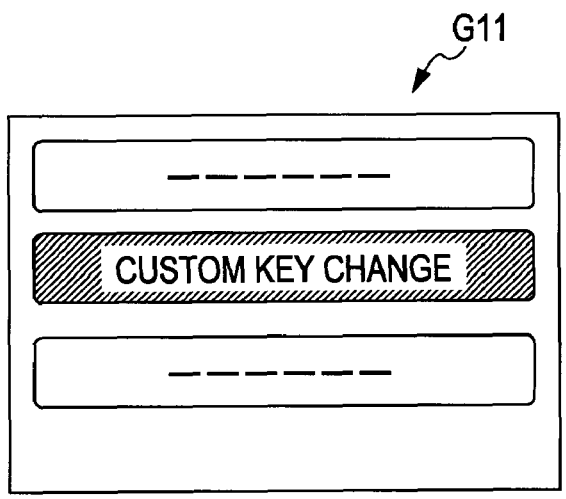
FIG. 8 is a drawing of a display screen of a back-face monitor.
Figure 9:
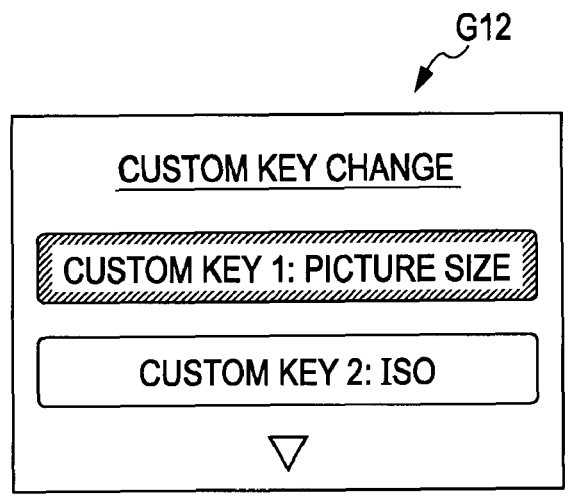
FIG. 9 is a drawing of a display screen of the back-face monitor.
Figure 10:
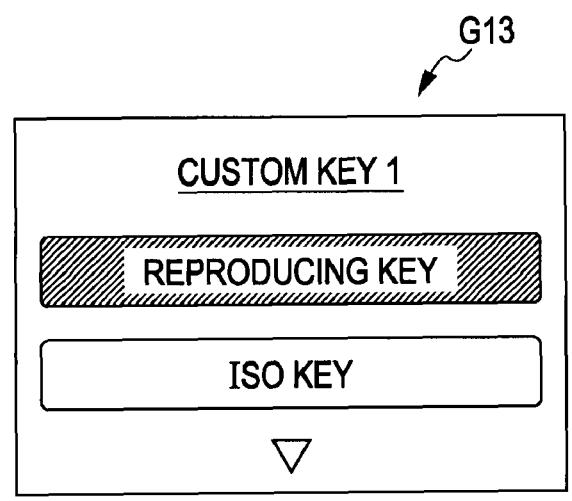
FIG. 10 is a drawing of a display screen of the back-face monitor.
Figure 11:
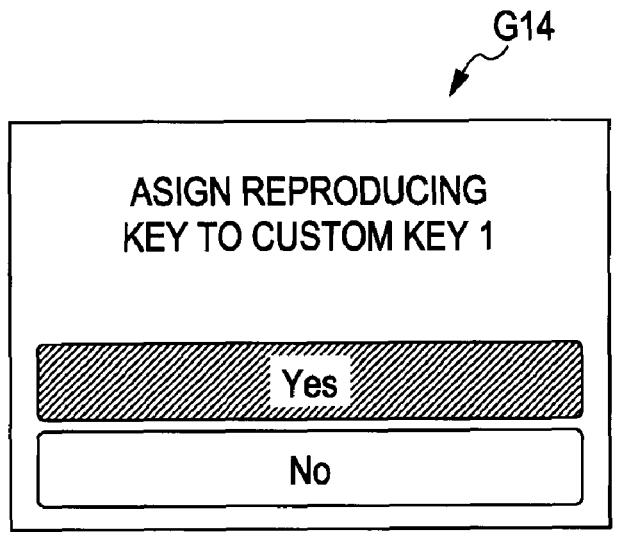
FIG. 11 is a drawing of a display screen of the back-face monitor.

FIG. 7 is a flowchart showing the setup changing operation about the allocating function to the custom keys C1, C2, and C3; FIGS. 8 to 11 are drawings showing various picture frames G11 to G14 displayed on the back-face monitor 12, respectively. The setup changing operation will be described with reference to these drawings. A case where the function of the reproducing button 86 is allocated to the custom key C1 is exemplified herein; however, the other setup changing operations are the same.

First, when an operator pushes down the menu button 87, the image-pickup apparatus 1 displays the menu picture frame G11 (see FIG. 8) on the back-face monitor 12 in response to the pushing operation (Step SP11). On the menu picture frame G11, a plurality of options including "change custom key" are displayed.

Then, when the operator selects a desired option, i.e., "change custom key", from among a plurality of the options by operating the multi-selector 83, the image-pickup apparatus 1 assumes the instruction input to "change custom key" (Step SP12). Such select operation is executed by moving a cursor (corresponding to the oblique line region in FIG. 8) with the up/down operation (or left/right operation) of the stick part 83e of the multi-selector 83 so as to position the cursor to the desired option ("change custom key" herein) from among a plurality of the options for pushing down the stick part 83e.

Then, the image-pickup apparatus 1 displays the menu picture frame G12 on the back-face monitor 12. On the menu picture frame G12, names of a plurality of custom keys are displayed together with their allocated functions at present. For example, on the menu picture frame G12 of FIG. 9, it is displayed that to the custom key C1, the setup function of "picture size" (image size) is allocated; to the custom key C2, the setup function of "ISO" (ISO sensitivity) is allocated.

Then, the operator selects a target custom key to be changed (target customizing custom key) from the options displayed on the menu picture frame G12 using the multi-selector 83 (Step SP13). In response to the select operation, the image-pickup apparatus 1 specifies the selected custom key as a changing target so as to display the menu picture frame G13 (FIG. 10) displaying a list of the functions to be allocated to the custom key on the back-face monitor 12.

Next, the operator selects the function to be allocated from the options displayed on the menu picture frame G13 using the multi-selector 83 (Step SP14).

In response to the select operation, the image-pickup apparatus 1 specifies the function selected by an operator as a target to be allocated so as to display the menu picture frame G14 confirming the selected content (Step SP15). On the menu picture frame G14, the confirmation is displayed whether the setup content that reproducing key is assigned (allocated) to custom key 1 (C1) is "Yes" or "No".

When the option "No" is selected by the operator so that the gist that the setup content is incorrect is inputted, the process is returned to Step SP14 so as to again select the function to be allocated. On the other hand, when the option "Yes" is selected by the operator so that the gist that the setup content is correct is inputted, the process proceeds to Step SP16.

At Step SP16, the image-pickup apparatus 1 stores the new setup content that to the custom key selected at Step SP13, the function selected at Step SP14 is allocated (to "custom key C1", the function of "reproducing key" is allocated). Specifically, the setup content stored in the non-volatile memory 135 is replaced with the new setup content for renewing the setup content. Then, the image-pickup apparatus 1 finishes operating "change custom key" and the back-face monitor 12 is returned to the display state before the menu button 87 is pushed down (Step SP17).

When the setup changing operation is completed as mentioned above, the content allocated to the target custom key has been changed. FIG. 12 is a drawing of the setup content before changing; FIG. 12 is a drawing of the setup content after changing. As is understood by the comparison between FIG. 12 and FIG. 13, the function allocated to custom key C1 is changed from "Picture Size Setting" to "Image Reproducing".

After the setup change, by depending on the new setup content, the function corresponding to the pushed down key is executed in response to the pushing down of the custom keys C1, C2, and C3.

2. Others

The embodiment according to the present invention has been described above; however, the invention is not limited to the embodiment.

For example, in the above-description, a case where a single function is selectively allocated to each of the custom keys C1, C2, and C3 at a certain time has been exemplified; however, the invention is not limited to this case. Specifically, a plurality of functions may also be allocated to each of the custom keys C1, C2, and C3. For example, different functions may be allocated to the normal pushing and the long pushing of the custom keys C1, C2, and C3, respectively. Specifically, a plurality of pushing down states (the normal pushed state and the long pushed state herein) are detected in distinction in accordance with the difference in period of pushing down time (long or short) of the custom keys C1, C2, and C3, so that to the plurality of pushing down states, different functions may be allocated, respectively. For example, the pushing down state with the duration of longer than one second may be determined to be "long pushed state" while that with the duration of one second or less may be determined to be "normal pushed state".

Figure 14:
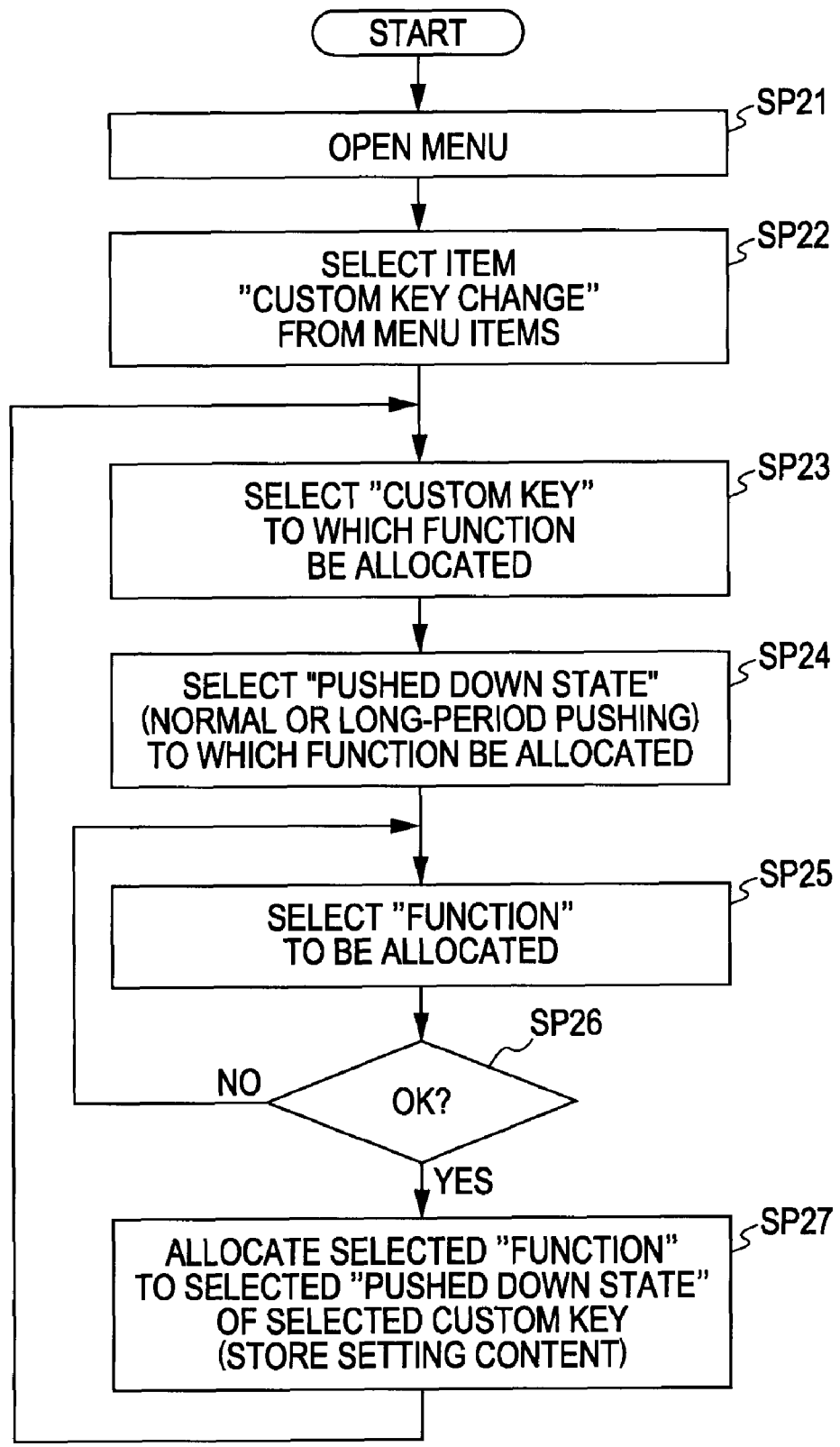
FIG. 14 is a flowchart showing the setup changing operation of an allocated function according to a modification.

FIG. 14 is a flowchart showing the setup changing operation about such a modification; FIGS. 15 to 19 are drawings showing various picture frames G22 to G26 displayed on the back-face monitor 12, respectively. The setup changing operation according to the modification will be described with reference to these drawings. A case where the function of "reproducing key" is allocated to the long pushing operation of "custom key C3" is exemplified herein; however, the other allocating operations are the same.

First, when an operator pushes down the menu button 87, the image-pickup apparatus 1 displays the menu picture frame G11 (see FIG. 8) on the back-face monitor 12 (Step SP21).

Then, when the operator selects a desired option, i.e., "change custom key", from among a plurality of the options, the image-pickup apparatus 1 assumes the instruction input to "change custom key" (Step SP22) so as to display the menu picture frame G22 on the back-face monitor 12.

Figure 15:
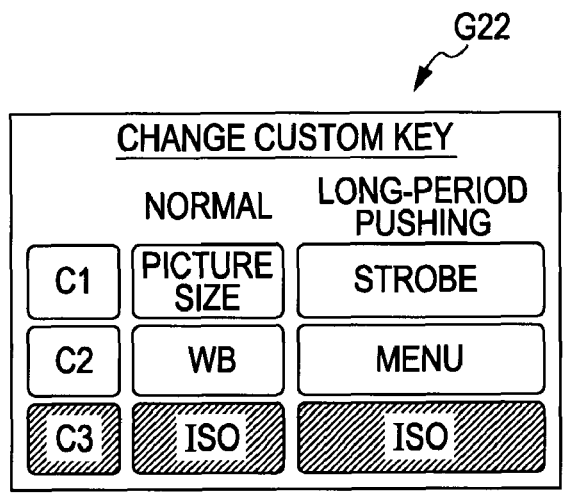
FIG. 15 is a drawing of a display screen of the back-face monitor.
Figure 16:
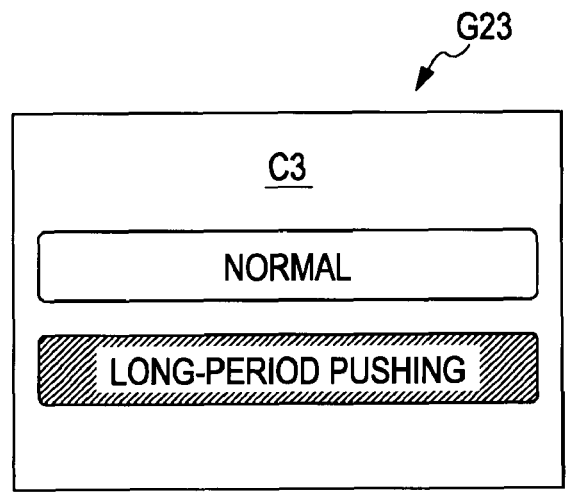
FIG. 16 is a drawing of a display screen of the back-face monitor.
Figure 17:
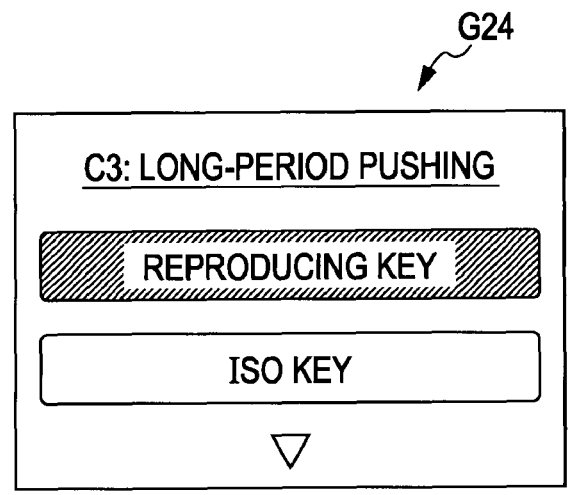
FIG. 17 is a drawing of a display screen of the back-face monitor.
Figure 18:
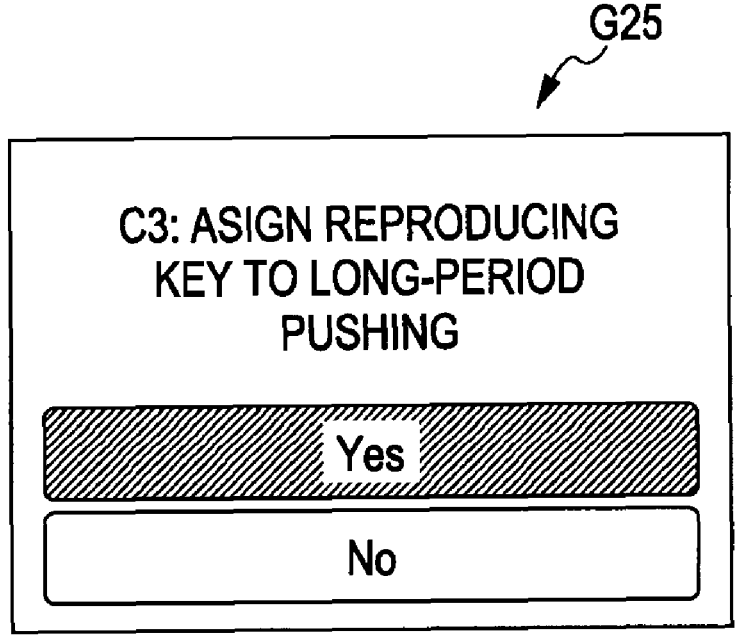
FIG. 18 is a drawing of a display screen of the back-face monitor.
Figure 19:
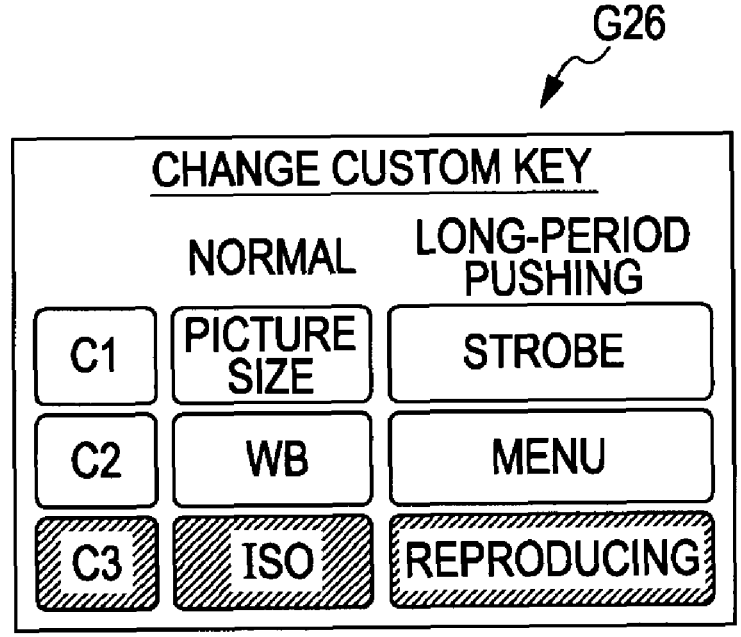
FIG. 19 is a drawing of a display screen of the back-face monitor.

On the menu picture frame G22, the allocating state at present is shown. Specifically, for each of a plurality (three, herein) of custom keys C1 to C3, the allocated content to the normal pushing state and the allocated content to the long pushing state are shown. Referring to FIG. 15, to the normal pushed state of the custom key C1, "picture size" is allocated, and to the long pushed state of the custom key C1, "strobe" is allocated. Also, to the normal pushed state of the custom key C2, "WB" is allocated, and to the long pushed state of the custom key C2, "menu" is allocated. Furthermore, to the normal pushed state of the custom key C3, "ISO" is allocated, and to the long pushed state of the custom key C3, "ISO" is also allocated.

Then, the operator selects a target custom key to be changed (target customizing custom key, (the custom key C3, herein)) from the options displayed on the menu picture frame G22 using the multi-selector 83 (Step SP23). In response to the select operation, the image-pickup apparatus 1 specifies the selected custom key as a changing target so as to now display the menu picture frame G23 (FIG. 16) for selecting "pushed state" as a changing target on the back-face monitor 12.

The operator selects a changing target "pushed down state" ("long-period pushing" herein) from the options displayed on the menu picture frame G23 using the multi-selector 83 (Step SP24). In response to the select operation, the image-pickup apparatus 1 specifies the pushed down state selected as a changing target so as to now display the menu picture frame G24 (FIG. 17) on the back-face monitor 12 displaying a list of functions to be allocated.

The operator selects a function to be allocated from the options displayed on the menu picture frame G24 using the multi-selector 83 (Step SP25).

In response to the select operation, the image-pickup apparatus 1 specifies the function selected by the operator as an allocating target so as to display the menu picture frame G25 (FIG. 18) for confirming the selected content (Step SP26). On the menu picture frame G25 of FIG. 18, the confirmation is displayed whether the setup content that "reproducing key is assigned to the long-period pushing of the custom key C3" is Yes or No.

When the gist that the setup content is incorrect is inputted by the operator, the process is returned to Step SP25 so as to again select the function to be allocated. On the other hand, when the gist that the setup content is correct is inputted by the operator, the process proceeds to Step SP27.

At Step SP27, the image-pickup apparatus 1 stores the new setup content in that to the pushed down state selected at Step SP24 of the custom key selected at Step SP23, the function selected at Step SP25 is allocated. Specifically, the setup content stored in the non-volatile memory 135 is replaced with the new setup content for renewing the setup content. Then, when the process is returned to Step SP23, the image-pickup apparatus 1 displays the menu picture frame (for confirming the setup content) G26 displaying the new setup content on the back-face monitor 12 instead of the menu picture frame G22 displaying the setup content before change.

Thereafter, according to the modification, the setup changing operation of the custom keys C1, C2, and C3 is continued in the same way. When the setup changing operation is completed or it is stopped, an appropriate button may be pushed down. For example, when the shutter button 11 is pushed down, the setup operation is completed and the back-face monitor 12 is turned off, proceeding to a photographic preparatory state. Alternatively, by pushing down the menu button 87, the menu picture frame may be displayed so as to operate the other setups.

When the setup changing operation described above is completed, the content allocated to each of the custom keys C1, C2, and C3 is changed. After changing the setup, by depending on the new setup content, the function corresponding to the pushed down key is executed in response to the pushing down of the custom keys C1, C2, and C3.

According to the modification described above, a plurality of functions may be allocated to each of the custom keys C1, C2, and C3, so that the limited number of the custom keys C1, C2, and C3 arranged in a limited space where being capable of operating with the right thumb can be efficiently utilized.

Figure 20:
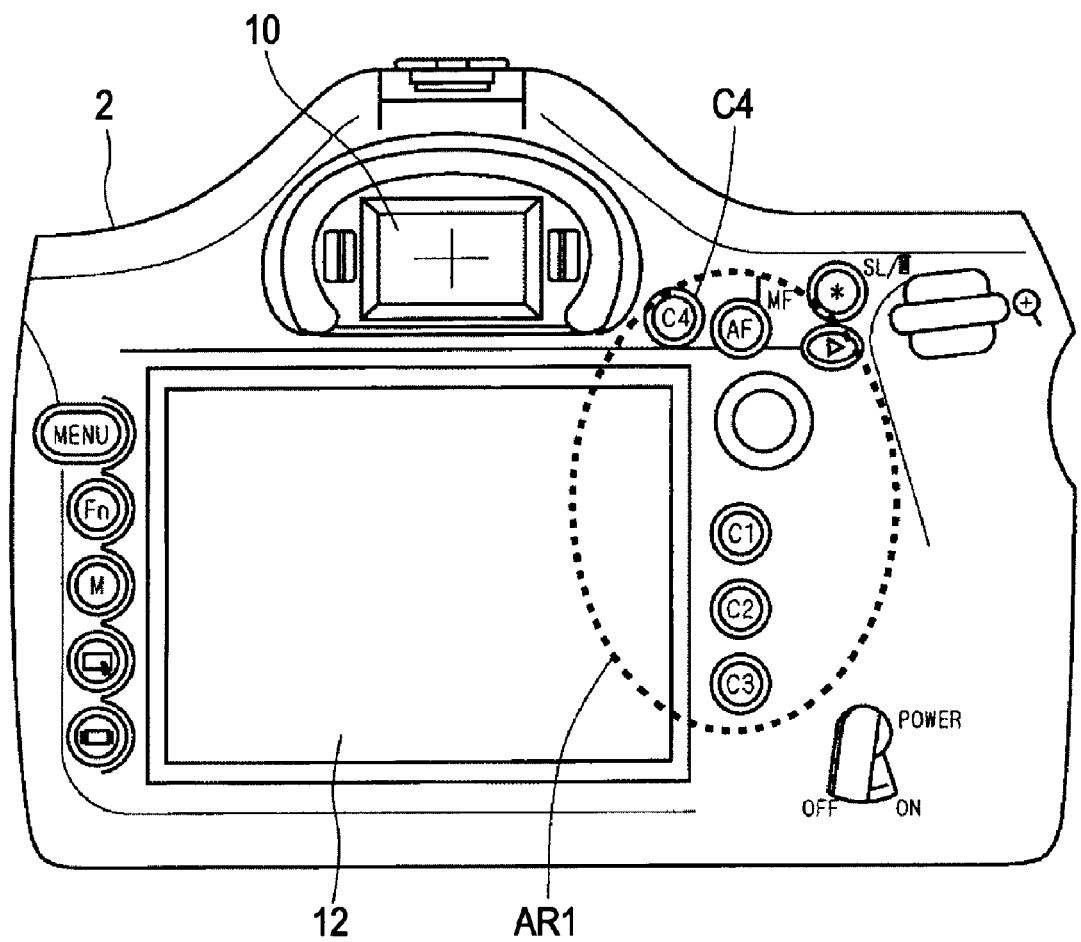
FIG. 20 is a rear view of an image-pickup apparatus according to another modification.

According to the embodiment described above, the custom keys C1, C2, and C3 are arranged on the right peripheral region of the back-face monitor 12; however, the invention is not limited to this embodiment. For example, as shown in FIG. 20, on the right of the optical finder 10, more specifically, on the right peripheral region of the optical finder 10, the custom key C4 capable of customizing the allocated function may also be arranged.

In this application, the operating member is assumed to be arranged within a certain region when not only the whole operating member exists in the region but also the center portion or the essential portion of the operating member exists in the region.

When a plurality of functions are allocated to a certain one operating member with the fixed function N1 corresponding to a mode, the plurality of functions allocated to the operating member with the fixed function N1 may be entirely allocated the custom key corresponding to a mode. For example, three functions allocated to the AE lock button 85, specifically, "AE lock" instruction function in the normal photographic mode, "slow synchro" switching function in the flash photographic mode, and "delete" instruction function in the reproducing mode, may be entirely allocated to the custom key C3. However, the invention is not limited to this, so that part of the plurality of functions allocated to the operating member with the fixed function N1 may also be allocated to the custom key. For example, among the three functions allocated to the AE lock button 85, only "delete" function may also be allocated to the custom key C3.

According to the embodiment described above, a button-type custom key (custom button) is adopted as an operating member capable of customizing the allocated function; however, the invention is not limited to this, so that other type operating members, such as a slide switch and a dial, may also be adopted.

It should be understood by those skilled in the art that various modifications, combinations, sub-combinations and alterations may occur depending on design requirements and other factors insofar as they are within the scope of the appended claims or the equivalents thereof.

What is claimed is:

1. An image-pickup apparatus comprising:
  a back-face monitor;
  a first operating member, to which a predetermined function is fixedly allocated; and
  a second operating member having a customizable allocated function, wherein
  when an operator grips a standard gripping part of the image-pickup apparatus with a right hand during photography with the image-pickup apparatus in a horizontal position, the second operating member is arranged so as to be operated with a right thumb of the right hand by moving the joints of the right thumb without substantially changing the gripping state of the right hand on the standard gripping part except for the right thumb,
  in the horizontal position, the second operating member is positioned to the right of a right edge of the back-face monitor, between extensions of top and bottom edges of the back-face monitor,
  when an operator grips an auxiliary gripping part, other than the standard gripping part, of the image-pickup apparatus with a right hand during photography with the image-pickup apparatus in a vertical position, the second operating member is arranged so as to be operated with a right thumb of the right hand by moving the joints of the right thumb without substantially changing the gripping state of the right hand on the auxiliary gripping part except for the right thumb,
  in the vertical position, the second operating member is positioned above a top edge of the back-face monitor, between extensions of left and right edges of the back-face monitor, and
  the auxiliary gripping part is detachably connected to the image pickup apparatus.

2. The apparatus according to claim 1, wherein the first operating member is arranged so as to be operated with the right thumb of the right hand by moving the joints of the right thumb without substantially changing the gripping state of the right hand on the standard gripping part except for the right thumb.

3. The apparatus according to claim 1, wherein the first operating member is arranged in a right back-face region of the image-pickup apparatus at the horizontal position.

4. The apparatus according to claim 1, wherein in the first operating member itself or in its peripheral region, a denotation is added to show the predetermined function fixedly allocated to the first operating member.

5. The apparatus according to claim 1, wherein the second operating member is a button-type operating member, and a plurality of pushed-down states are detected in distinction in accordance with the difference in period of pushing down time of the button-type operating member, so that to the plurality of the pushed-down states, different functions can be allocated, respectively.

6. The apparatus according to claim 1, wherein at least one of the first and second operating members includes a touch sensitive mechanism to detect an input.

7. The apparatus according to claim 1, wherein
  the standard gripping part and the auxiliary gripping part each includes a redundant operating member, and
  a same functionality is allocated to each of the redundant operating members of the standard gripping part and the auxiliary gripping part.

8. The apparatus according to claim 1, further comprising:
  a plurality of second operating members, each having a customizable allocated function,
  when the image-pickup apparatus is in the horizontal position, the second operating members are positioned along a common vertical to the right of the right edge of the back-face monitor, between extensions of the top and bottom edges of the back-face monitor, and
  when the image-pickup apparatus is in the vertical position, the second operating members are positioned along a common horizontal above the top edge of the back-face monitor, between extensions of the left and right edges of the back-face monitor when the image pickup apparatus is positioned in the vertical position.

* * * * *